J. Haddleton,
Cage Trap,
N⁰ 69,089. Patented Sep. 24, 1867.
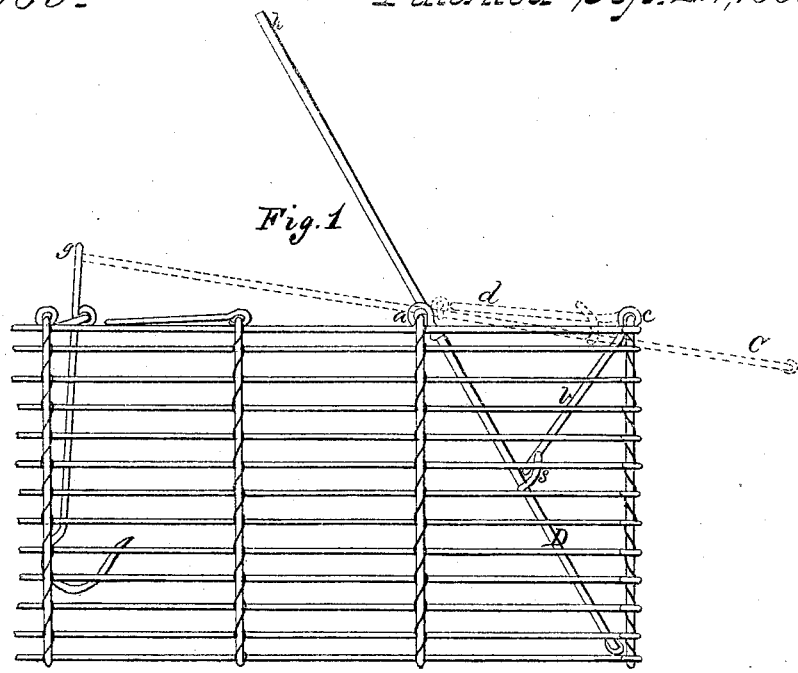
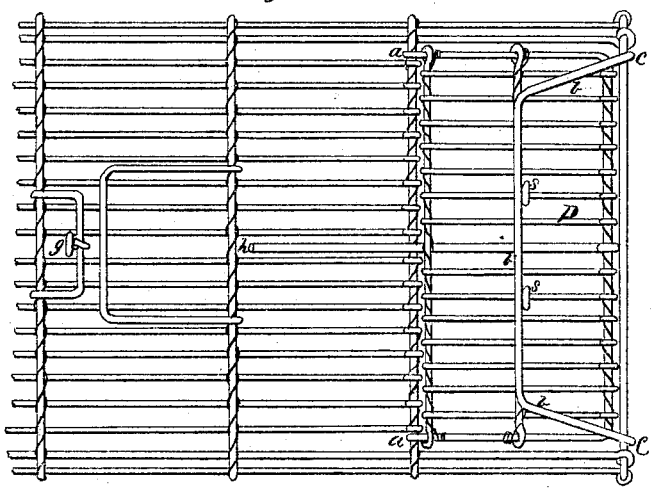
Witnesses
Wm. S. Loughborough
Lyman M. Newton.
Inventor:
Joseph Haddleton

United States Patent Office.

JOSEPH HADDLETON, OF ROCHESTER, NEW YORK, ASSIGNOR TO HIMSELF AND JOHN SNOW, OF SAME PLACE.

*Letters Patent No. 69,089, dated September 24, 1867.*

IMPROVEMENT IN ANIMAL TRAPS.

*The Schedule referred to in these Letters Patent and making part of the same.*

TO ALL WHOM IT MAY CONCERN:

Be it known that I, JOSEPH HADDLETON, of Rochester, in the county of Monroe, and State of New York, have invented a new and useful "Improvement in Animal Traps;" and I do hereby declare that the following is a full, clear, and exact description thereof, reference being had to the accompanying drawings, making part of this specification, in which—

Figure 1 is a side elevation of a portion of an ordinary animal trap, with my invention attached.

Figure 2 is a top view of the same.

Like letters indicate corresponding parts.

This invention relates to that class of animal traps which have a "fall" door or gate, and its nature consists in substituting for the ordinary spiral springs used for closing and holding the door closed a drop-latch or bail, which securely locks the door shut the instant the trap is sprung.

To enable others to make and use my invention I will describe its construction and operation.

I construct the trap in any desired style or size. The door D I provide with a suitable stop or stops, $s$, and it is hinged to the frame of the trap at $a$, as shown in the drawings. I provide a locking-latch or bail, $b$, which is hinged loosely to the end of the frame at $c$. When the trap is set the door D is swung up into the position shown by the dotted lines C, and the bail is raised to the position shown by the dotted lines $d$. The door must be made and hung so as to stand obliquely, as shown in fig. 1, when the outer end strikes the bottom of the trap, whereby the locking-latch $b$ is permitted to drop to the position shown by the full lines in fig. 1, which is a little past a right angle with the face of the door, where it is caught and held by the rests or stops $s$. The door and the bail or latch both assume this position instantaneously when the animal springs the trap, which is done by drawing the eye $g$ from the end of the door-bar $h$, as in other traps of this class. It will be seen that by this substitution and arrangement of the door D and the locking-latch $b$ the long, heavy, spiral springs heretofore used on this class of traps for holding the door shut are entirely dispensed with, and the door is thoroughly locked, whereas in the former case the animal might and often does overcome the spring and release itself from the trap, which is impossible with the gravity door and locking-latch herein shown. This construction also effects a saving in the manufacture of an ordinary-sized trap of about ten or twelve cents.

What I claim is—

The hinged strap or bail $b$, in combination with the door D of animal traps, for the purpose of automatically locking the same when closed, in the manner herein shown and described.

JOSEPH HADDLETON.

Witnesses:
WM. S. LOUGHBOROUGH,
LYMAN M. NEWTON.